May 20, 1930.  E. M. LENNOX  1,759,359
INSECT CATCHER
Filed Nov. 28, 1928
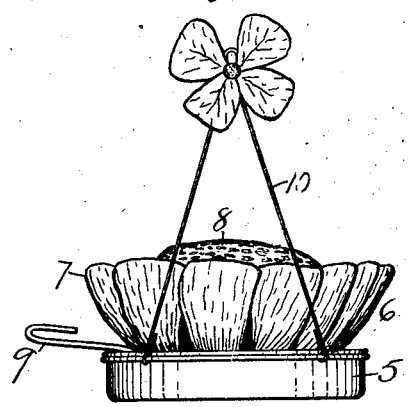
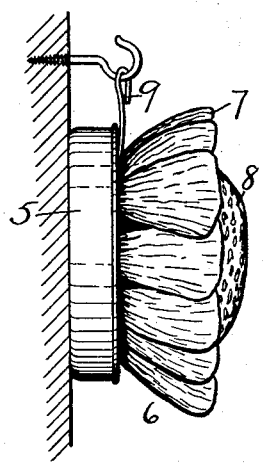 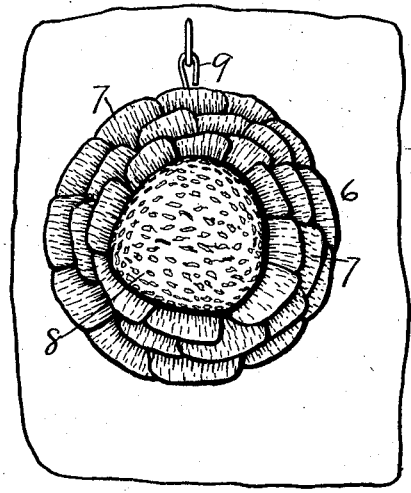
INVENTOR
Eva M. Lennox.
by
Arthur B. Jenkins
ATTORNEY Patented May 20, 1930

1,759,359

UNITED STATES PATENT OFFICE

EVA M. LENNOX, OF HARTFORD, CONNECTICUT

INSECT CATCHER

Application filed November 28, 1928. Serial No. 322,556.

My invention relates more especially to that class of devices that are employed for the extermination of insects, the device being particularly applicable to the destruction of flies, and an object of my invention, among others, is the production of a device of this class that shall be simple in construction, sightly in appearance, and one that may be used with safety.

One form of my improved destroyer, in the construction and use of which the objects herein set out, as well as others, may be attained, is illustrated in the accompanying drawings, in which—

Figure 1 is a side view of my improved device illustrating one manner of suspension of the device.

Figure 2 is a similar view illustrating another manner of suspension of the device.

Figure 3 is a face view of the device.

In the accompanying drawings the numeral 5 indicates a tray or pan that may be made of any suitable material shaped to contain a liquid when desired. A pad generally denoted by the numeral 6 is formed at its base to be set within the pan 5 and to be secured therein as by an adhesive or other fastening means.

The pad, as illustrated herein, resembles a flower comprising petals 7 and a center 8, the latter somewhat resembling the center of a flower. The petals will be preferably formed from a material that will absorb moisture, such as crepe paper, and the center will be formed preferably from a substance that will absorb and retain moisture. In the structure shown herein, the center comprises a sponge.

The center 8 and the petals 7, the latter, if desired, may be saturated with a poisonous solution including arsenic or other suitable poison and also including some substance that will attract insects as, for instance, a material having a sweet characteristic.

The device may be set upon a flat surface, in which case, the moistened substance will, to some extent, be contained in the pan 5. It may also be provided with a means as a loop 9 for hanging it up from one edge, or it may have a cord 10 by means of which it is suspended in a horizontal position. The loop 9 may be formed from a suitable covered wire to resemble the stem of the flower.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. An insect catcher including a pan, and means for supporting said pan in a vertical or horizontal position, and a pad made to assimilate a fanciful object secured within and projecting from said pan, and comprising an inner and outer portion, one at least of which is saturated with a poisonous ingredient.

2. An insect catcher including a pan and a pad made to assimilate a flower secured within and projecting from said pan, said pad comprising an outer and an inner portion, one at least of which is saturated with a poisonous ingredient.

3. An insect catcher including a pan and a pad made to assimilate a flower and including an outer portion resembling petals and an inner portion comprising a sponge, one of which portions at least is saturated with a poisonous ingredient.

4. An insect catcher including a pan, and a pad made to assimilate a flower and compirsing an outer portion made from pieces of paper formed to resemble pedals and a central portion comprising a sponge, one of said portions at least being saturated with a poisonous ingredient.

EVA M. LENNOX.